United States Patent [19]

Pickenhagen et al.

[11] 4,247,572
[45] Jan. 27, 1981

[54] FLAVORING WITH MIXTURES OF IONONES

[75] Inventors: Wilhelm Pickenhagen, Chavannes-des-Bois; Alistair Y. Smith, Geneva, both of Switzerland

[73] Assignee: Firmenich SA, Geneva, Switzerland

[21] Appl. No.: 46,658

[22] Filed: Jun. 8, 1979

[30] Foreign Application Priority Data

Jun. 15, 1978 [CH] Switzerland ......................... 6527/78

[51] Int. Cl.³ .............................................. A23L 1/235
[52] U.S. Cl. ................................................. 426/538
[58] Field of Search ........................................ 426/538

[56] References Cited

PUBLICATIONS

Aretander, Perfume and Flavor Chemicals, vol. I, 1969, Published by the Author: Montclair, N.J., Items No. 948, 1777, 1778.
Fenaroli's Handbook of Flavor Ingredients, 2nd Ed., 1975, Edited by Fwia et al., CRC Press: Cleveland, pp. 593–594 of vol. 2.

*Primary Examiner*—Joseph M. Golian

[57] ABSTRACT

The invention relates to the utilization of a mixture of α-dihydroionone, a compound of formula

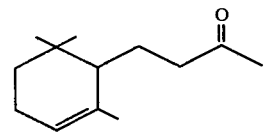

in combination with α- and β-ionone as flavouring agent in foodstuffs and beverages in general. Typically, the said compound enables the reconstitution of fruity type flavours, namely of raspberry character.

4 Claims, No Drawings

FLAVORING WITH MIXTURES OF IONONES

THE INVENTION

The instant invention provides a method for imparting, improving or enhancing the taste and aroma of foodstuffs and beverages of fruity flavour character, which method comprises incorporating in said foodstuffs and beverages a composition comprising α-dihydroionone in admixture with α- and β-ionone.

The invention relates further to a foodstuff or a beverage having a fruity type flavour prepared in accordance with the method defined above.

Another object of this invention consists in a flavouring composition for use as effective flavouring ingredient in the method defined above.

BACKGROUND OF THE INVENTION

The constant increase of the world food consumption accompanied by a concomitant reduction of the areas reserved to arable land provoke a raising pressure on the traditional sources of agriculture. Practically, no product escape this trend and, consequently, there is a distinct necessity to have recourse more widely to synthetic reconstitutions which could offer to the consumer not only the advantage of being cheaper but also that of being available at a high quality standard, especially insofar as their flavour characteristics are concerned.

There has been considerable work performed in the flavour industry related to the reconstitution of the characteristic flavour of red-currant type fruits, such as for example strawberries, raspberries, bilberries or cranberries.

Several investigators have described in details the nature of the aroma of certain of these fruits, in particular raspberry [see e.g.: Helv.Chim.Acta, 46, 2297 (1963); idem 43, 1120 (1960); idem 54, 1891 (1971)] and various flavouring compositions destined to confer a raspberry flavour to foodstuffs and beverages are presently commercialized. None of these compositions however possesses the typical fresh and natural character of the aroma of the fruit itself.

Quite unexpectedly, we have discovered that by the utilization of a composition comprising α-dihydroinonone, a compound of formula

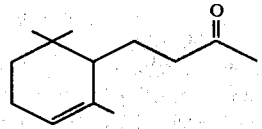

in admixture with α- and β-ionone, it was possible to reproduce faithfully the characteristic aroma and taste of the raspberry fruit.

Moreover, the said composition is perfectly suited to the aromatization of foodstuffs and beverages in general, especially whenever it is desired to impart to said consumable materials a natural taste of berries. Thus, it is possible to confer or enhance gustative notes such as fruity, woody, green, floral or even, in some instances, amber like notes.

PREFERRED EMBODIMENTS OF THE INVENTION

The proportions at which the compositions of the invention can achieve useful gustative effects vary within wide limits. Preferentially, these proportions are of from about 0.1 to 5 ppm (parts per million) based on the total weight of the aromatized product into which the composition is incorporated. These values, however, should not be interpreted restrictively and it should be understood by those skilled in the art that concentrations lower or higher than those indicated above may be used whenever it is desired to achieve special effects. It is moreover well known in the art that the concentrations of a given flavourant depend on the nature of the specific material it is desired to aromatize and on the nature of the coingredients in a given composition.

The respective proportions of the different constituents of the composition of the invention can also vary to a certain extent. Typically, they are of about 1:1:1 to 4:2:0.1 by weight (α-ionone:β-ionone:α-dihydroionone).

The composition of the invention can be used in its isolated state and directly added to the foodstuff or beverage it is desired to aromatize, or more frequently it is utilized in combination with current flavouring coingredients, or in solution with common edible solvents such as for example triacetine, diethyleneglycol or ethanol.

α- And β-ionone have been described as being constituents of the aroma of raspberry [see e.g.: Z. Lebensm. Unters.-Forsch., 160, 393 (1976) and Z. Lebensm. Unters.-Forsch., 153, 23 (1973)]; moreover, their utilization is widespread in the field of flavours and enter in a large number of currently available commercial compositions of various nature. On the contrary, α-dihydroionone has not found sofar any recognized utility in the art. The mutual effect exerted by the three constituents of the composition of the invention can be defined as being of synergistic nature. This fact can be illustrated in more detailed manner by the examples which follow.

α- And β-ionone are commercially available products.

α-Dihydroionone can be prepared by catalytic hydrogenation of α-ionone according to usual processes.

EXAMPLE 1

α-Dihydroionone was added, at the concentrations indicated below, to an acidic sugar syrup prepared by dissolving 650 g of sucrose in 1 lt of water containing 10 g of a 50% aqueous solution of citric acid.
a. 0.01 ppm
b. 0.10 ppm
c. 1.00 ppm These three samples have been subjected to a taste evaluation by a panel of experienced tasters, whose judgement can be summarized as follows:
a. slightly fruity character, reminiscent of raspberry;
b. fruity, woody, green, slightly floral, raspberry;
c. powerful, woody, amber floral character.

α- And β-ionone were evaluated, both in their isolated pure form and in combination with α-dihydroionone, by dissolving them in acidic sugar syrup prepared as described above. The concentrations used are given hereinbelow:

a. α-ionone  0.20 ppm
b. α-ionone  0.20 ppm+α-dihydroionone 0.10 ppm
c. β-ionone  0.10 ppm
d. β-ionone  0.10 ppm+α-dihydroionone 0.10 ppm
e. α-ionone  0.20 ppm+β-ionone 0.10 ppm f. α-ionone    0.20 ppm + β-ionone 0.10 ppm + α-dihydroionone 0.10 ppm.

The experts unanimously declared that the addition of α-dihydroionone to α- and β-ionone enhanced the green, fruity and raspberry character of the syrup.

EXAMPLE 2

A commercial high grade raspberry syrup was aromatized by adding thereto α- and β-ionone and α-dihydroionone, respectively. The following table indicates the concentrations used (ppm) based on the total weight of the flavoured syrup.

|  | A | B | C | D |
|---|---|---|---|---|
| α-ionone | 0.4 | 0.4 | 0.4 | 0.4 |
| β-ionone | 0.2 | 0.2 | 0.2 | 0.2 |
| α-dihydroionone | — | 0.01 | 0.1 | 0.2 |

The thus obtained syrups were diluted 3 times of their volume with water and then subjected to evaluation.

The syrup samples flavoured with B, C and D possessed a fresher and greener character by comparison with the sample flavoured with A. Owing to its more typical character of fresh raspberry fruits, the sample flavoured with D was the preferred one.

EXAMPLE 3

By making use of the flavouring compositions described in Example 2, deep-frozen raspberries were aromatized after having been defrosted and prepared in the form of a puree. The samples aromatized with compositions B and C were preferred as having an enhanced fresh raspberry character, whereas the sample aromatized with composition D was considered as being too floral.

EXAMPLE 4

Samples of puree prepared from frozen fresh raspberries were flavoured by means of the aroma compositions described below (parts by weight based on the total weight of the flavoured foodstuff [ppm]):

|  | A | B | C |
|---|---|---|---|
| α-ionone | 0.4 | 0.4 | 0.4 |
| β-ionone | 0.2 | 0.2 | 0.2 |
| α-dihydroionone | — | 0.2 | 0.4 |

The flavoured puree together with a sample of un-flavoured one were used at 20% in a water ice base made up of sugar and acid stabiliser. The ices were frozen and evaluated.

Aromatized samples were all considered to have a fuller, more fruity character than the unflavoured sample.

Samples flavoured with compositions B and C possessed a character of fresh fruit and an enhanced top note and were defined as being more seedy.

EXAMPLE 5

A base flavouring composition of raspberry type was prepared by mixing together the following ingredients (parts by weight):

| | |
|---|---|
| Vanilline | 5 |
| p-Hydroxy-phenyl-butan-3-one | 30 |
| β-Ionone | 1 |
| α-Ionone | 2 |
| Geraniol | 3 |
| Methylisoeugenol | 3 |
| Phenylethanol | 5 |
| Hex-2-en-1-al | 5 |
| Isobutyl acetate | 10 |
| Acetic acid | 20 |
| Hex-3-en-1-ol | 30 |
| Ethyl acetate | 50 |
| Triacetine | 836 |
| | 1000 |

By making use of the above base composition and by adding thereto α-dihydroionone in the proportions indicated, there were obtained four novel compositions as follows (parts by weight [ppm]):

|  | A | B | C | D |
|---|---|---|---|---|
| α-dihydroionone at 1%* | — | 1 | 10 | 20 |
| base composition | 100 | 100 | 100 | 100 |
| 95% ethanol | 900 | 899 | 890 | 880 |
|  | 1000 | 1000 | 1000 | 1000 |

*in 95% ethanol

The novel compositions thus prepared were evaluated by a panel of flavourists by making use of a sugar syrup as vehicle and of hard sugar boilings containing 1.2% citric acid. The concentration in the syrup was of 0.1% and in sugar boilings of 0.3%. The opinion of the panel is summarized hereinbelow:

By comparison with the sample flavoured with A, samples of syrup flavoured with B and C presented a fresher gustative top note having a more natural, green fresh fruit character.

Sample of syrup flavoured with D was more woody/seedy than those flavoured with B and C.

Samples of hard sugar boilings flavoured with C and D possessed a more fruity and fresher character than the sample flavoured with A. The sample flavoured with D presented moreover a better impact than those flavoured with A, B or C.

What we claim is:

1. A method for imparting, improving or enhancing the fruit flavour character of foodstuffs or beverages which method comprises incorporating in said foodstuffs or beverages a composition consisting essentially of α-dihydroionone in admixture with α-ionone and β-ionone, in which composition the respective proportions of the three constituents are about 1:1:1 to 4:2:0.1 by weight of α-ionone:β-ionone:α-dihydroionone.

2. A method according to claim 1 wherein from about 0.1 to 5 ppm of the composition is incorporated in said foodstuffs or beverages.

3. A method according to claim 1 wherein the fruity flavor character is raspberry.

4. A composition useful for imparting, improving or enhancing the fruit flavour character of foodstuffs or beverages which composition consists essentially of α-dihydroionone, in admixture with α-ionone and β-ionone in which the respective proportions of the three constituents are about 1:1:1 to 4:2:0.1 by weight of α-ionone:β-ionone:α-dihydroionone.

* * * * *